April 11, 1939.  C. C. SHUTT  2,154,289
DAMPER WINDING FOR SYNCHRONOUS MOTORS
Filed May 26, 1938
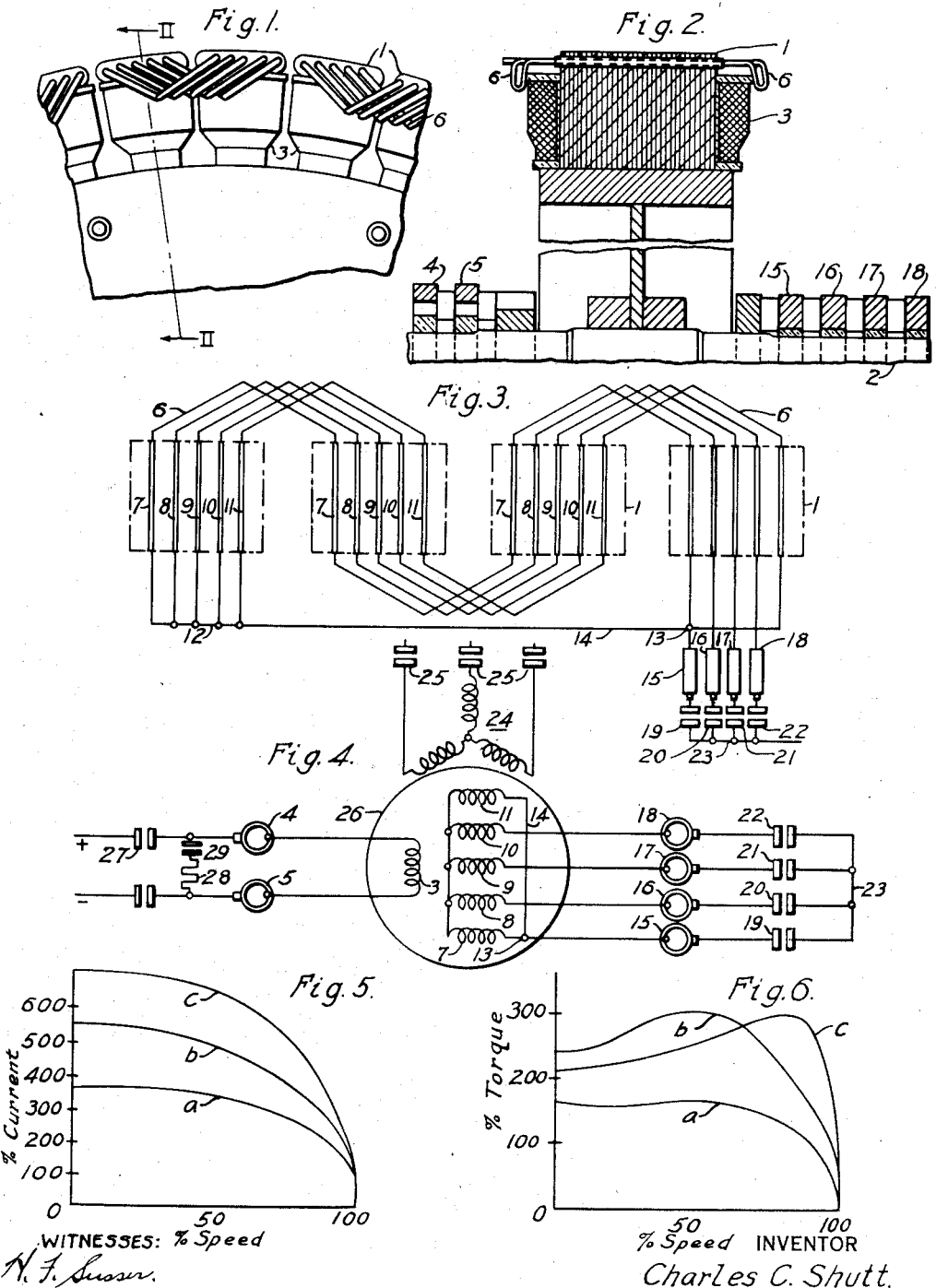
INVENTOR
Charles C. Shutt.
BY O. B. Buchanan
ATTORNEY Patented Apr. 11, 1939

2,154,289

UNITED STATES PATENT OFFICE 2,154,289

DAMPER WINDING FOR SYNCHRONOUS MOTORS

Charles C. Shutt, Lima, Ohio, assignor to Westinghouse Electric & Manufacturing Company, East Pittsburgh, Pa., a corporation of Pennsylvania Application May 26, 1938, Serial No. 210,183

13 Claims. (Cl. 172—120)

My invention relates to self-starting, polyphase synchronous motors and, more particularly, to damper windings for synchronous motors of large size and high torque.

Synchronous motors of large size are always provided with damper windings, and it is customary to use these windings for starting the machine, since a synchronous motor, as such, has no inherent starting torque. When the motor is started in this way, the starting current and starting torque can be controlled by varying the resistance and reactance of the damper winding. The patent to H. V. Putman No. 1,899,719, issued February 28, 1933, and my prior Patent No. 1,958,903, issued May 15, 1934, both assigned to Westinghouse Electric & Manufacturing Company, disclose arrangements for controlling the starting current and torque in this way. In both of these patents, the damper winding, or a part of it, is connected through collector rings to an external resistance which is cut out in steps as the motor speeds up. These external resistances are not desirable, however, since they are expensive and occupy considerable space.

The object of my invention, therefore, is to provide means for controlling the starting current and starting torque of a synchronous motor without the use of external resistances.

More specifically, the object of the invention is to provide a damper winding for a synchronous motor, the resistance and reactance of which can be varied without requiring any external resistances. To this end, a winding is provided which is, in general, somewhat similar to the windings of the prior patents mentioned above, but which is arranged so as to provide a plurality of separate circuits extending around the field structure which can be successively connected together in parallel as the machine speeds up, thus reducing the resistance of the winding.

The invention will be more fully understood from the following detailed description taken in connection with the accompanying drawing, in which:

Figure 1 is a fragmentary side elevation of a field member;

Fig. 2 is a transverse section approximately on the line II—II of Fig. 1;

Fig. 3 is a diagrammatic development of the damper winding of my invention;

Fig. 4 is a wiring diagram showing the connections for a synchronous motor embodying the invention; and Figs. 5 and 6 are curves showing typical characteristics that may be obtained with the new damper winding.

The new damper winding has been shown in the drawing as applied to a rotating field member of a synchronous motor, although it could equally well be used on a machine in which the field structure is stationary and the armature rotates. As shown in the drawing, the field member comprises a plurality of pole pieces 1 which are mounted on any suitable type of rotor structure secured to a shaft 2. Direct-current field windings 3 are placed on each of the pole pieces and connected to collector rings 4 and 5 mounted on the shaft 2. The damper winding consists of a plurality of bars of copper or other suitable material placed in slots in the pole faces and connected together between adjacent poles by end connections 6, which may be of any desired type.

The connection of the damper winding is shown more particularly in Fig. 3, which is a diagrammatic development of a damper winding having five bars per pole, although it will be understood that any other suitable number of bars might be used. Only four poles are shown in the figure, although in an actual machine there would, of course, be more than four poles. As seen in this figure, the damper winding consists of bars 7, 8, 9, 10 and 11 placed in slots in each pole face. All the bars in corresponding positions in the pole faces are connected together in series. Thus, all the bars 7 are joined together in one circuit and, similarly, the bars 8, 9, 10 and 11 on all the pole faces are connected together. The end connections 6 joining bars on adjacent poles are placed alternately at opposite ends of the pole pieces, forming a plurality of separate series circuits which extend in zigzag fashion around the field member. All the circuits are permanently connected together at one end by a suitable connector 12 and, at the other end, the circuits of bars 7, 8, 9 and 10 are connected to collector rings 15, 16, 17 and 18, respectively, mounted on the shaft 2. The circuit of bars 11 is connected in parallel with that of bars 7 at 13, and a connector 14 joins the point 13 to the connector 12 to complete the circuit for the winding as a whole. If desired, the connectors 12 and 14 may take the form of a conventional end ring, such as is used with the usual short-circuited damper winding. The circuits of the damper winding are connected through the collector rings 15, 16, 17 and 18 to switches 19, 20, 21 and 22, respectively, which can be closed to connect the separate circuits in parallel at 23.

The connections of the motor are shown diagrammatically in Fig. 4, in which a three-phase stator winding of any suitable type is indicated at 24, connected to a three-phase supply line through a line switch 25. The rotor is indicated at 26 and carries the damper winding, which comprises five separate circuits connected together as described above, and the field winding 3, which is connected to a source of direct-current excitation through a suitable switch 27. A resistor 28 is preferably connected across the field winding through a switch 29, which may be either manually or automatically operated.

The field winding is preferably open-circuited during the starting period and up to about 80% of synchronous speed. When a closed-circuited field winding is used to assist in providing starting torque for a synchronous motor, the rotor power factor is very low, resulting in a considerable increase in the starting current, and I prefer, therefore, to leave the field circuit open during the greater part of the starting period. In order to prevent the induced voltages in the field winding from becoming too high, it is necessary for the field to be wound for low voltage excitation, i. e., about 40 to 50 volts, or else to provide means for sectionalizing the field winding during the starting period. This may be conveniently done, if desired, by using a centrifugal switch mounted on the rotor of the type shown in the Putman patent mentioned above.

To start the motor, the field winding switches 27 and 29 and the damper winding switches 19, 20, 21 and 22 should be open. The line switch 25 is first closed to energize the stator winding. The damper winding circuit comprising the bars 7 and 11 then acts in the same manner as the conventional squirrel-cage damper winding because of the connection 14 which completes a circuit linking the quadrature axis flux and furnishes sufficient starting torque to start the machine. As the motor speeds up, the switches 19 to 22 are successively closed, connecting the other damper winding circuits one after the other in parallel, and thus decreasing the resistance and reactance of the damper winding to form a low resistance and low reactance secondary winding which operates to bring the motor up to speed in substantially the same manner as the winding of my prior patent hereinabove mentioned. When the motor has reached approximately 80% of synchronous speed, the field winding circuit is closed through the resistor 28 by means of the switch 29 and it cooperates with the damper winding to bring the motor up nearly to synchronous speed in the manner described in the patent. The switch 27 is then closed and the switch 29 opened to supply the direct-current excitation, which causes the machine to pull into synchronism. It should be understood, of course, that these switching operations may be performed automatically, if desired, by providing suitable control equipment.

The starting characteristics obtained with this winding can be varied to a considerable extent by proper design of the damper winding and they can be still further altered by making the different circuits of the damper winding of different resistance or reactance. This may be done by using bars of different size or of different materials or both. Thus, the circuit comprising bars 9 may be of different resistance from the circuit comprising bars 8 and 10, and they may both be different from the resistance of the circuit comprising bars 7 and 11. Any desired variation between the resistances of the different circuits may be used to give the characteristics desired.

The curves of Figs. 5 and 6 illustrate representative characteristics which may be obtained with the damper winding disclosed herein. Fig. 5 shows the starting current in percentage of full load current, and Fig. 6 shows the starting torque, both plotted against speed. In each figure, the curve a shows the characteristics with the switch 19 closed, curve b with the switches 19, 20 and 22 closed, and curve c with all four switches closed. It should be understood that these curves are merely representative as many variations can be obtained by proper design of the damper winding and by suitably varying the resistance of the different circuits.

It should now be apparent that a very effective means has been provided for controlling the starting current and torque of a synchronous motor by varying the resistance and reactance of the damper winding during the starting period. This arrangement gives a performance substantially equivalent to that of the damper winding of my prior patent, but it has the great advantage that external resistances are eliminated.

Although a specific embodiment of the invention has been illustrated and described, it is to be understood that it is capable of various modifications and changes without departing from the spirit of the invention, and that, in its broadest aspects, it is not limited to the details of construction shown, but includes all equivalent modifications and embodiments which come within the scope of the appended claims.

I claim as my invention:

1. A self-starting synchronous motor having a field member with a plurality of salient pole pieces thereon, a direct-current field winding on the pole pieces, a damper winding comprising a plurality of bars placed in slots in the pole faces, all the bars in corresponding positions in the pole faces being connected together in series, so as to form a plurality of circuits extending around the field member, means for connecting said circuits together successively in parallel, and a connection between the ends of the parallel circuit.

2. A self-starting synchronous motor having a field member with a plurality of salient pole pieces thereon, a direct-current field winding on the pole pieces, a damper winding comprising a plurality of bars placed in slots in the pole faces, all the bars in corresponding positions in the pole faces being connected together in series, so as to form a plurality of circuits extending around the field member, certain of said circuits being connected together in parallel with a connection between the points of paralleling, and means for successively connecting the remaining circuits in parallel therewith.

3. A self-starting synchronous motor having a field member with a plurality of salient pole pieces thereon, a direct-current field winding on the pole pieces, a damper winding comprising a plurality of bars placed in slots in the pole faces, all the bars in corresponding positions in the pole faces being connected together in series, so as to form a plurality of circuits extending around the field member, all of said circuits being connected together at one end thereof, means for successively connecting their other ends together, and a connection between the ends.

4. A self-starting synchronous motor having a field member with a plurality of salient pole pieces thereon, a direct-current field winding on the pole pieces, a damper winding comprising a plurality of bars placed in slots in the pole faces, all the bars in corresponding positions in the pole faces being connected together in series, so as to form a plurality of circuits extending around the field member, a connection joining all of said circuits at one end thereof, a connection between certain of said circuits at their other ends, means for successively joining the rest of the circuits to the last mentioned connection, and conducting means between said connections.

5. A self-starting synchronous motor having a field member with a plurality of salient pole pieces thereon, a direct-current field winding on the pole pieces, a damper winding comprising a plurality of bars placed in slots in the pole faces, all the bars in corresponding positions in the pole faces being connected together in series, so as to form a plurality of circuits extending around the field member, certain of said circuits having greater resistance than others, means for connecting the circuits together successively in parallel, and a connection between the points of paralleling.

6. A self-starting synchronous motor having a field member with a plurality of salient pole pieces thereon, a direct-current field winding on the pole pieces, a damper winding comprising a plurality of bars placed in slots in the pole faces, all the bars in corresponding positions in the pole faces being connected together in series, so as to form a plurality of circuits extending around the field member, the reactances of said circuits being unequal, means for connecting the circuits together successively in parallel, and a connection between the points of paralleling.

7. A self-starting synchronous motor having a rotating field member with a plurality of salient pole pieces thereon, a direct-current field winding on the pole pieces, a damper winding consisting of a plurality of bars placed in slots in the pole faces, end connections between bars in corresponding positions on adjacent pole pieces, the end connections being disposed alternately at opposite ends of the pole pieces so as to join the bars in a plurality of series circuits extending in zig-zag fashion around the field member, means for connecting said circuits together successively in parallel as the motor accelerates, and a connection between the points of paralleling.

8. A self-starting synchronous motor having a rotating field member with a plurality of salient pole pieces thereon, a direct-current field winding on the pole pieces, a damper winding consisting of a plurality of bars placed in slots in the pole faces, end connections between bars in corresponding positions on adjacent pole pieces, the end connections being disposed alternately at opposite ends of the pole pieces so as to join the bars in a plurality of series circuits extending in zig-zag fashion around the field member, means for connecting said circuits together successively in parallel as the motor accelerates, a connection between the points of paralleling, and means for closing the circuit of said field winding when the motor approaches synchronous speed.

9. A self-starting synchronous motor having a rotating field member with a plurality of salient pole pieces thereon, a direct-current field winding on the pole pieces, a damper winding consisting of a plurality of bars placed in slots in the pole faces, end connections between bars in corresponding positions on adjacent pole pieces, the end connections being disposed alternately at opposite ends of the pole pieces so as to join the bars in a plurality of series circuits extending in zig-zag fashion around the field member, means for connecting said circuits together successively in parallel as the motor accelerates, a connection between the points of paralleling, and means for closing the circuit of said field winding when the motor reaches about 80 per cent of synchronous speed.

10. A self-starting synchronous motor having a rotating field member with a plurality of salient pole pieces thereon, a direct-current field winding on the pole pieces, a damper winding consisting of a plurality of bars placed in slots in the pole faces, end connections between bars in corresponding positions on adjacent pole pieces, the end connections being disposed alternately at opposite ends of the pole pieces so as to join the bars in a plurality of series circuits extending in zig-zag fashion around the field member, certain of said circuits being permanently connected together in parallel, means for successively connecting the other circuits thereto in parallel as the motor accelerates, and a connection between the points of paralleling.

11. A self-starting synchronous motor having a rotating field member with a plurality of salient pole pieces thereon, a direct-current field winding on the pole pieces, a damper winding consisting of a plurality of bars placed in slots in the pole faces, end connections between bars in corresponding positions on adjacent pole pieces, the end connections being disposed alternately at opposite ends of the pole pieces so as to join the bars in a plurality of series circuits extending in zig-zag fashion around the field member, the circuits comprising the outermost bars on each pole piece being permanently connected together in parallel at their ends, a connection between the points of paralleling, and means for successively connecting the remaining circuits in parallel with the permanently connected circuits as the motor accelerates.

12. A self-starting synchronous motor having a rotating field member with a plurality of salient pole pieces thereon, a direct-current field winding on the pole pieces, a damper winding consisting of a plurality of bars placed in slots in the pole faces, end connections between bars in corresponding positions on adjacent pole pieces, the end connections being disposed alternately at opposite ends of the pole pieces so as to join the bars in a plurality of series circuits extending in zig-zag fashion around the field member, said circuits having unequal resistances, means for connecting the circuits together successively in parallel as the motor accelerates, and a connection between the points of paralleling.

13. A self-starting synchronous motor having a rotating field member with a plurality of salient pole pieces thereon, a direct-current field winding on the pole pieces, a damper winding consisting of a plurality of bars placed in slots in the pole faces, end connections between bars in corresponding positions on adjacent pole pieces, the end connections being disposed alternately at opposite ends of the pole pieces so as to join the bars in a plurality of series circuits extending in zig-zag fashion around the field member, said circuits having unequal resistances and reactances, means for connecting the circuits together successively in parallel as the motor accelerates, a connection between the points of paralleling, and means for closing the circuit of said field winding when the motor reaches at least 80 per cent of synchronous speed.

CHARLES C. SHUTT.